United States Patent [19]

Kondo

[11] Patent Number: 5,021,992

[45] Date of Patent: Jun. 4, 1991

[54] METHOD OF TRANSLATING DATA FROM KNOWLEDGE BASE TO DATA BASE

[75] Inventor: Hidefumi Kondo, Yamato, Japan

[73] Assignee: Hitachi, Ltd., Tokyo, Japan

[21] Appl. No.: 84,376

[22] Filed: Aug. 11, 1987

[30] Foreign Application Priority Data

Aug. 28, 1986 [JP] Japan .................................. 61-200092

[51] Int. Cl.⁵ .............................................. G09C 00/00
[52] U.S. Cl. .................................... 364/900; 364/513;
364/972; 364/972.2; 364/974; 364/974.1;
364/974.4; 364/974.5; 364/974.6
[58] Field of Search ... 364/200 MS File, 900 MS File,
364/300 MS File, 513

[56] References Cited

U.S. PATENT DOCUMENTS

| | | | |
|---|---|---|---|
| 4,680,705 | 7/1987 | Shu ...................................... | 364/300 |
| 4,704,695 | 11/1987 | Kimura et al. ....................... | 364/300 |
| 4,714,995 | 12/1987 | Materna et al. ...................... | 364/200 |
| 4,734,856 | 3/1988 | Davis .................................... | 364/300 |
| 4,736,306 | 4/1988 | Christensen et al. ................ | 364/513 |

OTHER PUBLICATIONS

Cobb et al., "Using 1.2.3," 2nd edition, Que Corp., Indianapolis, Indiana, 1985, pp. 244–247.
"Artificial Intelligence" by Christine Mann, *Physicians and Computers*, May 1986, pp. 7–12.
Dates, C. J., An Introduction to Database Systems Addison–Wesley Publishing Co., 1981, pp. 83–93, 117–123, 132–133.

*Primary Examiner*—Stuart N. Hecker
*Assistant Examiner*—Rebecca L. Rudolph
*Attorney, Agent, or Firm*—Fay, Sharpe, Beall, Fagan, Minnich & McKee

[57] ABSTRACT

A method for translating knowledge contained within a knowledge system into data records for a data base management system. The method collects the factual knowledge and other correlated auxiliary knowledge within the knowledge base, analyzes the frequency of the use of the knowledge in the knowledge system and proposes a data record structure for the data base to which the knowledge will be transferred. Upon operator approval, the factual and auxiliary knowledge is retrieved from the knowledge base, translated into data records in accordance with the approved data record structures and stored in the data base.

8 Claims, 7 Drawing Sheets

FIG. 5

COMPANY NAME{×××{RESIDENCE{×××}
      )                , TEL    {×××}
     500               ,EXECUTIVE{×××}                              501
                       ,NEW COMMODITY{×××{DATE OF ISSUE{×××}}}
                       ,DEVELOPED SYSTEM{×××}~502
                       ,AFFILIATED COMPANY{×××}~503
                       ,NEW PLAN{×××}}~504
                          (PROJECT)

PERSON'S NAME{×××{WORK FOR{×××}~511
      )                ,DEGREE{×××{UNIVERSITY{×××}}}}~512
     510

TITLE OF ARTICLE{×××{AUTHOR{×××}~521
      )                ,SOURCE{×××}}}~522
     520

FIG. 8

| 20 | 10 | 12 | 16 | 30 | 8 (BYTES) |
|---|---|---|---|---|---|
| COMPANY NAME | RESIDENCE | TEL | EXECUTIVE | NEW COMMODITY | DATE OF ISSUE |
|  |  |  |  |  |  |

FIG. 9

| 20 | 10 | 12 | 16 | 30 | 8 (BYTES) |
|---|---|---|---|---|---|
| TAIYOU SEKIYU | TOKYO | 03(121)1251 | YOUICHI OHTA | — | — |

FIG. 10

| 20 | 10 | 12 | 16 | 30 | 8 (BYTES) |
|---|---|---|---|---|---|
| COMPANY NAME | RESIDENCE | TEL | EXECUTIVE | NEW COMMODITY | DATE OF ISSUE |
| TAIYOU SEKIYU | TOKYO | 03(121)1251 | YOUICHI OHTA | — | — |
| TSUKIBOSHI DENKI | OHSAKA |  |  | HIGH QUAL. TV | 61.3 |
| NIPPON TSUSHINKI | — | 03(558)7136 | TAROU YAMADA | MULTI-FUNCTION WP | — |
| NIPPON TSUSHINKI | — | 03(561)6566 | TAROU YAMADA | MULTI-FUNCTION WP | — |

METHOD OF TRANSLATING DATA FROM KNOWLEDGE BASE TO DATA BASE

BACKGROUND OF THE INVENTION

The present invention relates to a method of translating data from a knowledge base to data for a data base in a data storage and utilization system.

As a system for utilizing an enormous amount of data with high efficiency through data storage and management, there is known a data base system (reference may be made, for example, to C. J. Date's "An Introduction to Database Systems" published by Addison-Wesley Publishing Company, 1981). The data base management system capable of storing and managing a large amount of data of particular categories and having systematic structures can afford an extensive retrieval function or capability by making use of the set operation, arithmetic operation and the like (reference may be made to the above cited literature, Section 4, pages 83 to 93 as well as Section 7, pages 117 to 123 and in particular pages 132 to 133).

On the other hand, the knowledge base can store miscellaneous knowledge data of different structures, and the knowledge base management system for managing the knowledge base is imparted with a function to perform inferential retrieval of the knowledge data on the basis of semantic relation, as is disclosed in Japanese Pat. Application Laid-Open No. 140443/1985 (JP-A-60-140443).

In the present state of the art, the data stored in the knowledge base diversify over a great number of different categories while the amount of data belonging to a single category remains relatively small. It is however expected that as the knowledge is accumulated more and more, the amount of knowledge data will attain a considerably great value. For dealing with such a large amount of knowledge data, there will undoubtedly arise a demand for an extensive retrieval function comparable to that of the data base management system. In this connection, it is however noted that the data stored in the knowledge base have no systematic architecture and thus ill-fitted for application of the retrieval function of the type carried out by the data base management system.

SUMMARY OF THE INVENTION

It is an object of the present invention to provide a data translation method which is capable of transferring or, so-called, transplanting data stored in a knowledge base to a data base for the purpose of allowing the extensive retrieval function of a data base management system to be fully made use of for the data of the knowledge base.

In view of the above and other objects which will be more apparent as description proceeds, the present invention teaches that the range of knowledge to be transferred from the knowledge base to the data base as well as data structure in the data base in concern is determined with the aid of a computer system, being followed by data translation of the knowledge data retrieved from the determined range of the knowledge base to the data of the determined data structure, wherein the data subjected to the data translation are stored in the data base.

According to an aspect of the present invention, the range of knowledge to be transferred from a knowledge base to a data base and the data structure which the knowledge to be transferred should assume in the data base are determined appropriately through man-machine operation, which is then followed by extraction of the knowledge of a predetermined range, translation of data structure and storage of the translated data in the data base, all being performed automatically by a computer system.

BRIEF DESCRIPTION OF THE DRAWINGS

FIG. 5 is a diagram showing an example of an intelligence scheme produced for a proposal;

FIGS. 8 to 10 are views for illustrating examples of data structures in a data base.

DETAILED DESCRIPTION OF THE PREFERRED EMBODIMENTS

Figure 2:
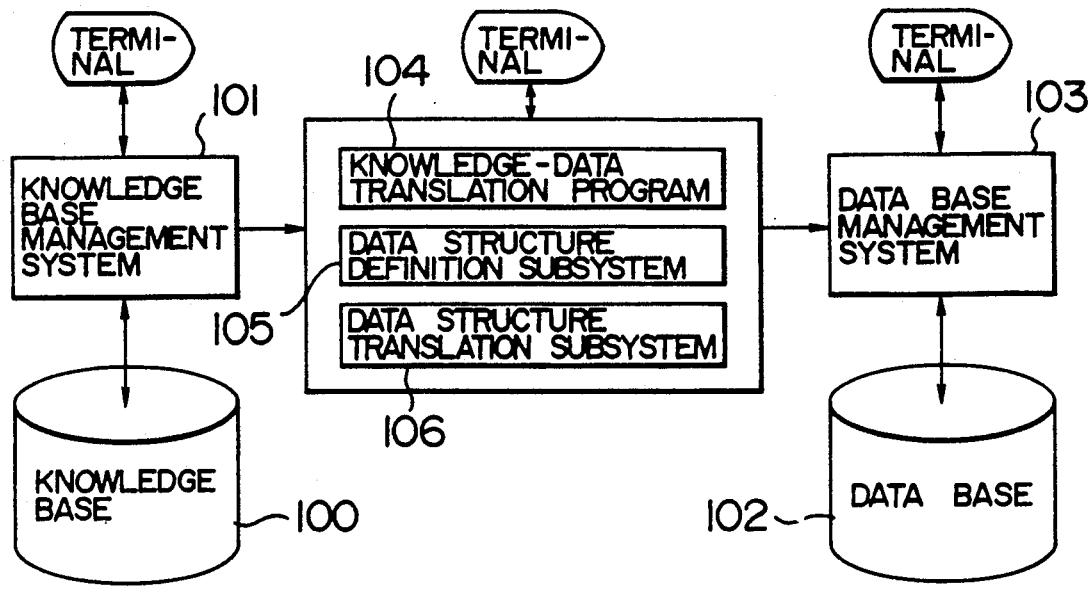
FIG. 2 is a view for illustrating schematically the concept of the present invention.

FIG. 2 is a view for illustrating schematically the concept of the present invention. A knowledge base 100 is stored in a secondary memory device. Storage of knowledges, management and retrieval are effected by a knowledge base management system 101. A data base 102 is also held in a secondary memory device. A data management system 103 is responsible for the storage, management and retrieval of data. A knowledge-data translation program 104 for carrying out the invention is a program prepared for transferring knowledge data (hereinafter referred to simply as knowledge or knowledges) stored in the knowledge base 100 to data for the data base 102 and includes a data structure definition subsystem 105 and a data structure translation subsystem 106. The data structure definition subsystem 105 determines through man-machine interaction the range of knowledge to be transferred to the data base and the data structure which the knowledge should assume in the data base 102. On the other hand, the data structure translation subsystem 106 serves to retrieve the knowledge of the determined range from the knowledge base 100 and translate the retrieved knowledge to the data of the data structure determined by the data structure definition subsystem 105, whereby the resulting data are stored in the data base 101. Access to the knowledge base 100 and the data base 102 is enabled through the knowledge base management system 101 and the data base management system 103.

Figure 3:
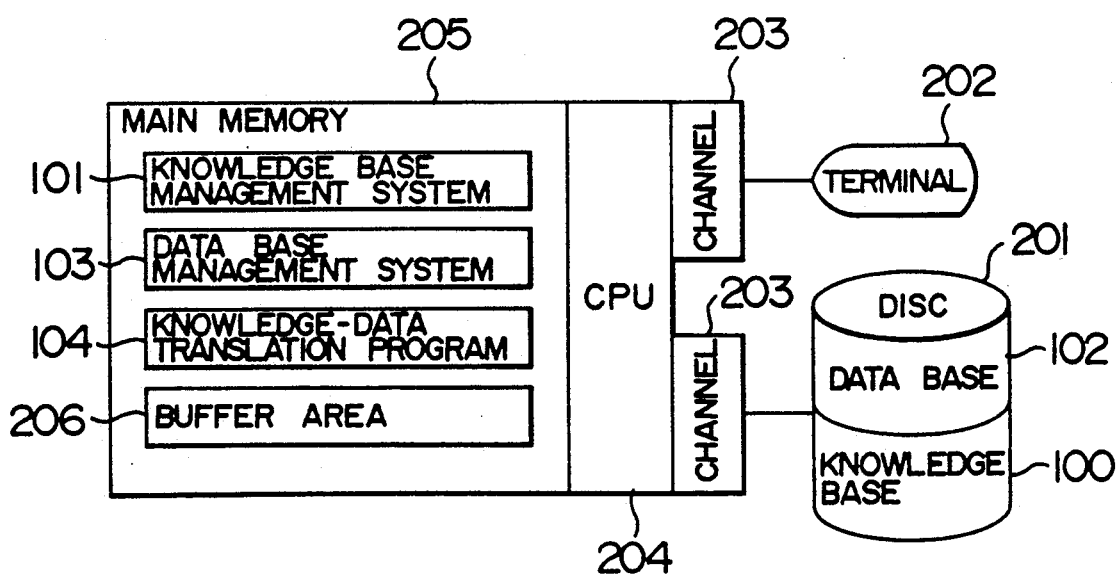
FIG. 3 is a view showing in a block diagram an exemplary arrangement of a computer system to which the invention can be applied.

FIG. 3 shows, as a typical example, a hardware configuration of the computer system to which the present invention can be applied. As will be seen, the computer system includes a disc device 201, a terminal device 202, channels 203, a CPU 204 and a main memory 205. The disc device holds thereon the knowledge base 100 and the data base 102. The main memory 205 stores therein the knowledge base management system 101, the data base management system 103 and the knowledge-data translation program 104. Additionally, a buffer area 206 is prepared. In the case of the illustrated embodiment, the data base 102 is a relational data base.

Figure 4:
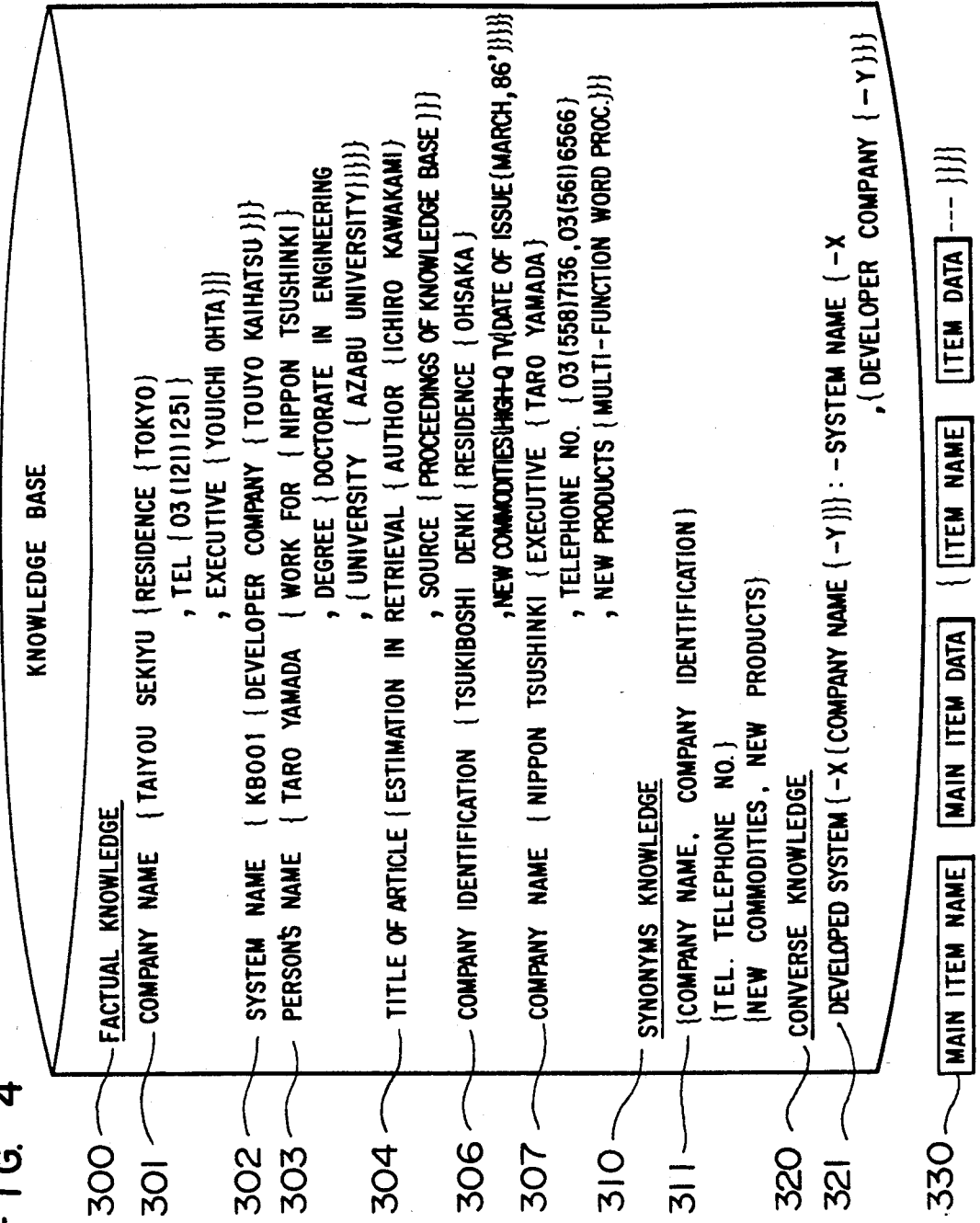
FIG. 4 is a view for illustrating the contents of a knowledge base.

FIG. 4 is a view for illustrating, by way of example, the contents of the knowledge base 100. The knowledge may be classified into factual knowledge 300 and auxiliary knowledge such as synonyms knowledge 310 and converse knowledge 320. In general, however, primary interest for the use of the knowledge base usually resides in the factual knowledge. A general syntax form of the knowledge is illustrated at 300 in FIG. 4. In the illustrated syntax form, "main item name" and "main item data" indicate the object of the knowledge, that is the theme, while "item name" and "item data" are the contents of the knowledge about the object indicated by the main item data. By way of example, the knowledge 301 has such contents that a company named "Taiyo Sekiyu" has residence in Tokyo, the telephone number (TEL) of which company is "03 (121) 1251" and the executive is "Youichi Ohta". The item name and the item data are of such a hierarchical form that an additional knowledge concerning the item data can be described in terms of the item name and the item data of lower rank. By way of example, the knowledge 306 has the contents that a company named "Tukiboshi Denki" has residence in Ohsaka, deals in the high quality televisions as the new line of commodities, and additionally the data of issue of the high quality television is "March, 1986". A single main item data or a single item data may be described in terms of plural item names. On the other hand, a single item name may be attached with a plurality of data. By way of example, in the case of knowledge 307, the item name "telephone number" is accompanied with two item data "03 (558) 7136" and "03 (561) 6566".

The synonyms knowledge 310 comprises a set or collection of different terms used in describing an identical entity when considered in the light of the factual knowledge. The synonyms knowledge is made use of to handle these different terms as the semantically same one. The knowledge 311, for example, indicates that "Company Name" and "Company Identification" may be considered to have the same meaning in the light of the factual knowledge.

The converse knowledge is to serve for indicating that two knowledges expressing the identical entity from the relatively converse standpoints have the same content. By way of example, the knowledge 321 is a definition that the description "the company which developed a system having the system name X is Y" (right side of a symbol ":-") is same as the description "the system developed by a company named Y is X".

Turning back to FIG. 6, operator may issue a request through the terminal 202 that certain data in the knowledge base 100 be transferred to the data base 102. In response to this request, the knowledge-data translation program 104 performs the processing described below by correspondingly controlling the CPU 204. The outline of this processing is illustrated in a flow chart in FIG. 1.

Figure 1:
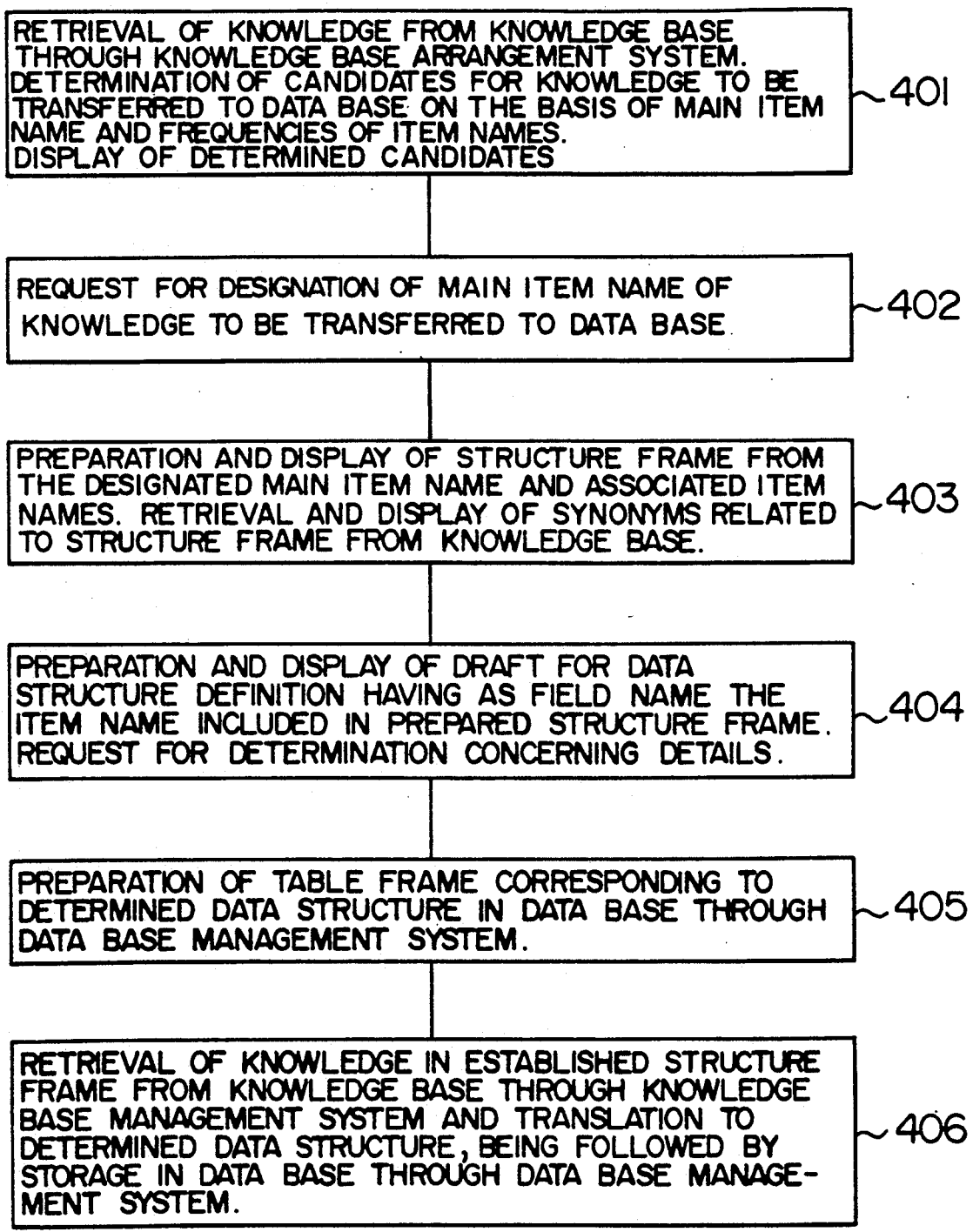
FIG. 1 is a view for illustrating in a flow chart a data translation method according to an embodiment of the present invention.

(i) Step 1 (block 401 in FIG. 1)

At first, the data structure definition subsystem 105 is activated to make a proposal concerning the knowledge to be transferred to the data base. The knowledge base contains therein numerous and various knowledge data in disorder as described hereinbefore. Accordingly, difficulty will be encountered in deciding which category of the knowledge could be preferably transferred to the data base. This step is to aid in making such difficult decision.

Under the circumstance, the data structure definition subsystem 105 calls the knowledge base management system to read out the contents of the knowledge base 100 into the buffer area 206, arrange the data in order and prepare a scheme of knowledge which includes comprehensively the main item name and the item names as illustrated in FIG. 5. In this figure, the main item name 500 is obtained from the knowledges 301, 306, 307 and other company-related knowledges. In this case, the main item name "Company Identification" of the knowledge 306 is handled to be equivalent to "Company Name" by the synonyms knowledge 311. With regard to the term having synonyms, it will be convenient to select the first occurrence of the terms in the synonyms knowledge 310. Alternatively, the term used with the highest frequency may be selected. For the item names "TEL", "New Commodities", the synonyms knowledge 310 can be utilized similarly. An item frame 501 is derived from the knowledges 306 and 307. An item frame 502 is derived by applying the converse knowledge 321 to the knowledge 302. More specifically, the knowledge 302 can be interpreted to have the same meaning as "Developed System {KB001 {Company Name {Toyou Kaihatsu}}}" which is equivalent to the description rearranged only in the order of the terms, i.e. "Company Name {Toyou Kaihatsu {Developed System {KB001}}}". Accordingly, the knowledge 302 may be processed as the knowledge having the company name as the main item name. Item frames 503 and 504 are derived from the knowledges not shown in FIG. 4. Item frames 511 and 512 each having a person's name as the main item name 510 are derived from the knowledge 303 concerning the persons' names. Finally, item frames 521 and 522 each including the title of article are derived from the knowledge 304 concerning the articles' titles.

Figure 6:
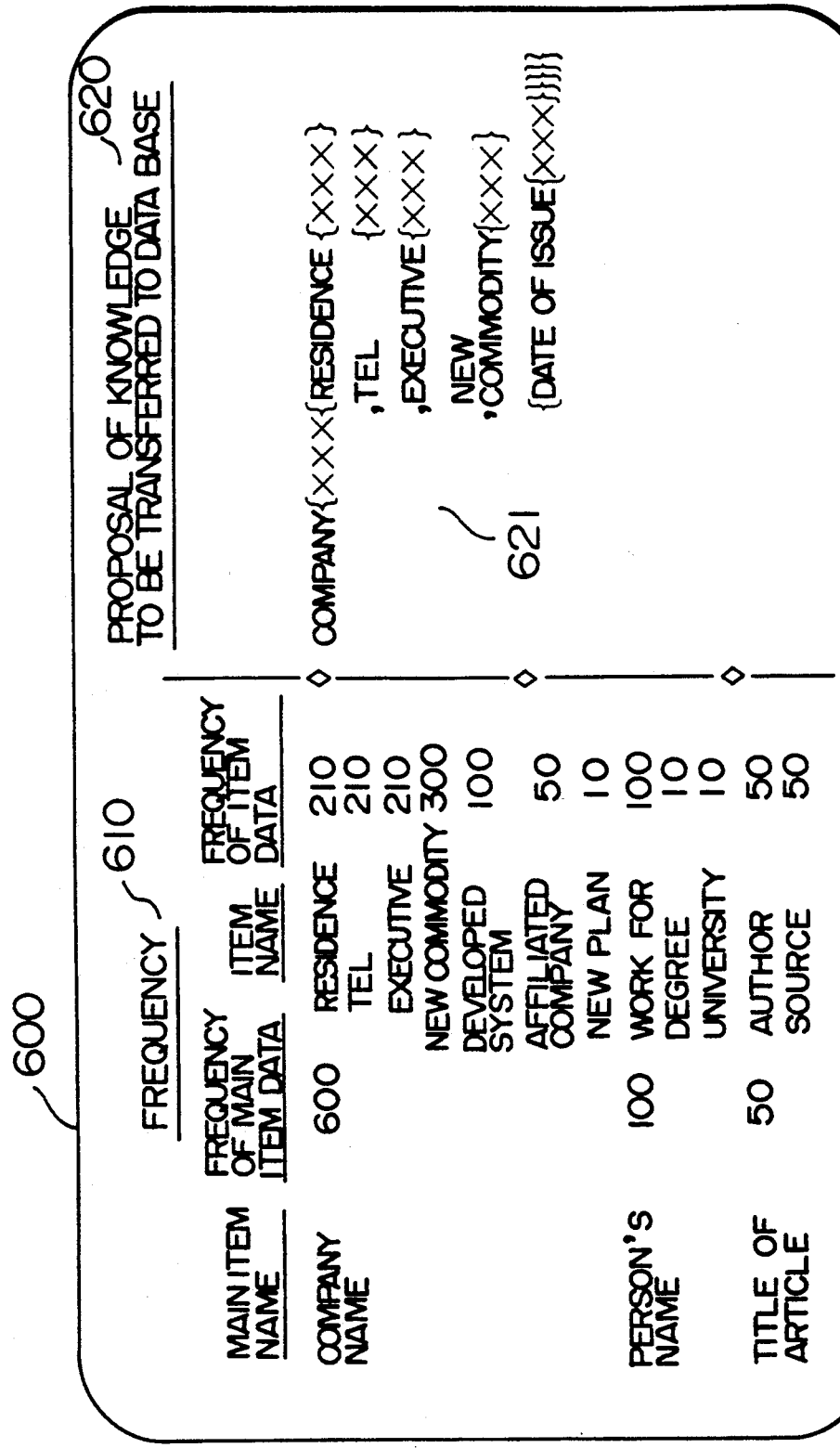
FIG. 6 is a view showing an example of displayed data for making a proposal to operator from the system.

Next, the data structure definition subsystem 105 prepares a table 610 containing frequency data concerning the individual main item name and the individual item names, as is shown in FIG. 6. In the case of this example, 600 main item data are available for the main item name "Company Name", and when the main item data are found for the "Company Name", there are then available 210 knowledges concerning "Residence" for each of the main item data. In this way, the main item name and the item names are indicated, as shown in FIG. 6.

After the analysis procedure described above, the data structure definition subsystem 105 selects the main item name and the item name having the respective frequencies higher than predetermined threshold values, for thereby determining the candidates for the knowledges to be transferred to the data base, which candidates are displayed as the proposal 620. In the case of the example illustrated in FIG. 6, the knowledge having a frequency greater than 200 is selected and prepared as the proposal 621. The system manager can determine and alter appropriately the threshold values mentioned above. The data base is a system suited for storage and retrieval of an enormous amount of data having systematic structures. Accordingly, the aforementioned threshold value for the frequency should preferably be high enough to allow full use of the characteristic features of the data base mentioned above.

(ii) Step II (block 402 in FIG. 1)

Figure 7:
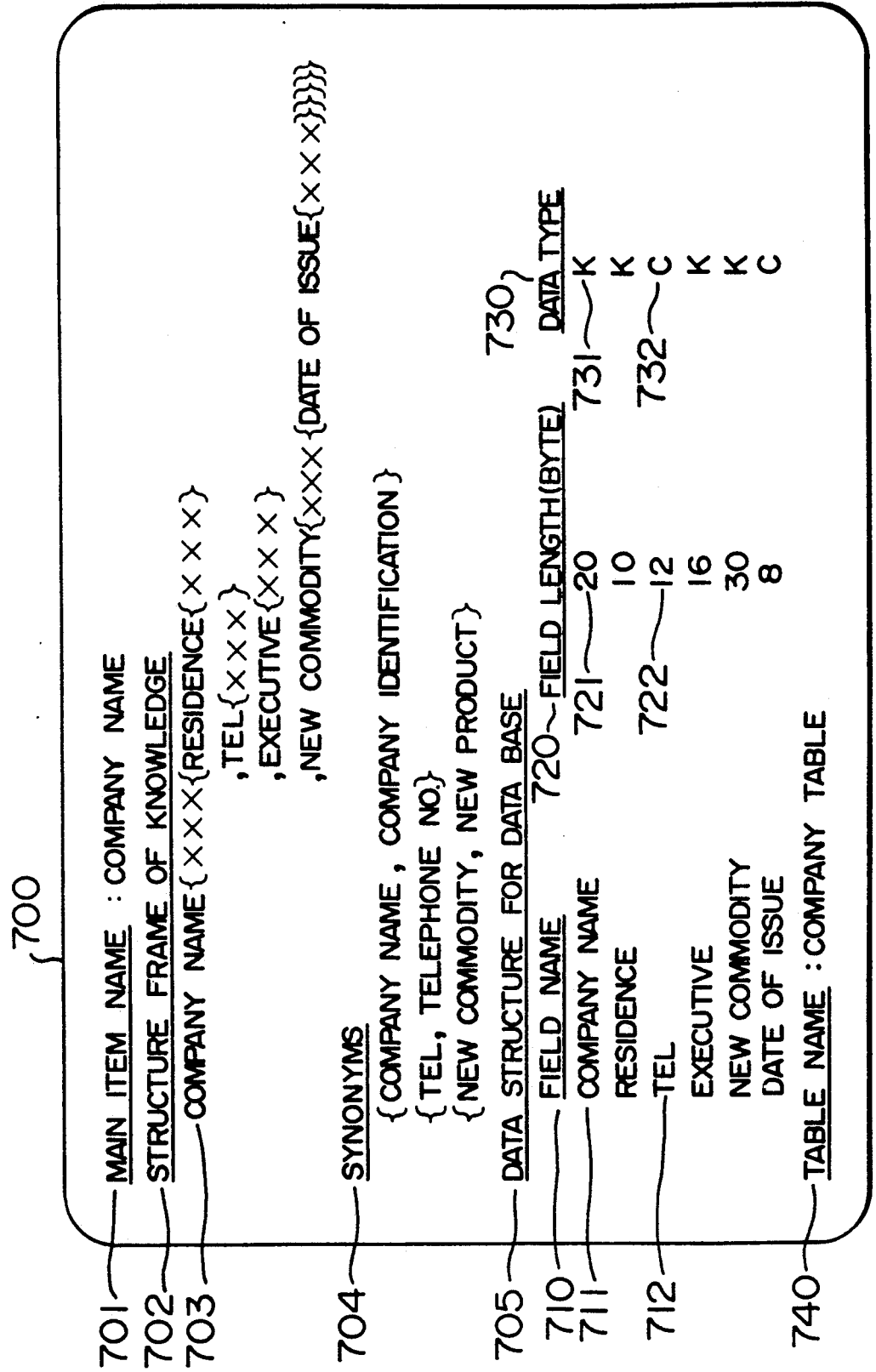
FIG. 7 is a view showing an example of displayed data for making determination of data structure.

In succession to the proposal described above, the data structure definition subsystem 105 prompts the operator to input the main item name of the knowledge to be transferred to the data base. FIG. 7 shows an examply display 700 produced at the instant step and the succeeding step III. As will be seen in this figure, the proposal 621 shown in FIG. 6 has been adopted for the main item name 701 with "Company Name" being inputted by the operator.

(iii) Step III (block 403 in FIG. 1)

When the main item name 701 is designated, the scheme 702 of the knowledge concerning the designated main item name is prepared. The scheme includes the main item name and the item names of the knowledge having the designated main item name. These data can be obtained from the scheme data (FIG. 5) prepared at the aforementioned step I. The data structure definition subsystem 105 extracts the item names associated with the designated main item name to prepare a scheme 703 which is then displayed. In the case of the example illustrated in FIG. 7, the designated main item name coincides with the proposal made by the system. Accordingly, the scheme is prepared in conformance with the proposal. However, in case the designated main item name differs from the proposal, all the item names associated with the designated main item name will be extracted.

Next, the data structure definition subsystem 105 retrieves the synonyms 704 relevant to the prepared scheme 703 from the knowledge base 100 by way of the knowledge base management system 103, the retrieved synonyms being then displayed. This display aids operator in his determining the field name explained hereinafter by indicating the synonyms for the item names as selected by the system.

(iv) Step IV (block 404 in FIG. 1)

Now, the preparation of data structure definition 702 of the data base is started. With the data structure definition subsystem 105, the main item name and the item names are copied to the field 710 at respective rows. The operator can replace the term unsuited as the field name by another one selected from the synonyms or the one which occurs to the operator. Further, unnecessary item names may be deleted. Reversely, when the proposal made by the system is adopted, the item name omitted by the system may be added. When the item name is deleted or added in this manner, the contents of the structure frame 702 is also altered correspondingly. Subsequently, the data structure definition system 105 prompts the operator to input field length 707 and the data type 708. In response, the operator inputs the requisite data. Referring to FIG. 7, "K" and "C" on the row of the data type 730 represents a Kanji code (Chinese character code) and an EBSDIC code, respectively. By way of example, entries 711, 721 and 731 indicate that the data of "Company Name" is represented by the kanji code having a length up to 20 bytes in the data base 102 (i.e. the field for "Company Name" in the data base is for the kanji code data in length up to 20 bytes). Further, entries 712, 722 and 732 indicate that the data of "TEL" is represented by the EBSDIC code in length up to 12 bytes.

Now, the data structure definition subsystem 105 prompts the operator to input the table name 740. In response, the operator may input suitable terms ("Company Table" in the case of the example illustrated in FIG. 7).

(v) Step V (block 405 in FIG. 1)

When the data structure definition is determined, the data structure definition subsystem 105 transfers the data structure definition as determined to the data base management system 103 by way of the buffer area 206, commanding the system 103 to prepare the table frame corresponding to the data structure in concern in the data base 102. FIG. 8 shows a table frame prepared in the data table for the data structure definition 705 shown in FIG. 7.

(vi) Step VI (block 406 in FIG. 1)

The data structure translation subsystem 106 is activated to perform translation of the data structure. The data structure translation subsystem 106 calls the knowledge base management system 101 to retrieve the knowledge contained in the established structure frame (702 in FIG. 7) into the buffer area 206 from the knowledge base 100 and translate the data format in accordance with the determined data structure definition (705 in FIG. 7). FIG. 9 shows the results of translation of the knowledge 301 shown in FIG. 4.

Finally, the data structure translation subsystem 106 calls the data base management system 103 to transfer the knowledge undergone the structure translation to the data base 102 to be stored therein. As the result, data of the table format shown in FIG. 10 is stored in the data base 102 which allows the extensive retrieval function of the data base management system 103 to be utilized.

In the case of the embodiment described above, the main item name of the knowledge to be transferred to the data base as well as the details of the data structure definition and the table name must be given by operator. As a modification of the illustrated embodiment, such arrangement may be also adopted in which the system prepares a draft for the items so that operator may command only execution unless necessity aries to alter the contents of the draft.

Further, the knowledge-data translation may be performed by other computer than that for managing the data base and the knowledge base. Beside, the knowledge-data translation, the data base management and the knowledge base management may be performed by separate computers, respectively.

As will be appreciated from the foregoing description, it is now made possible according to the present invention to transfer knowledge of an appropriate range from the knowledge base to the data base in a facilitated manner, whereby the intensive and extensive retrieval function or capability of the data base management system can be effectively made use of.

I claim:

1. A system for translating knowledge of a knowledge base which is comprised of a plurality of sets having the form of one or more item names and one or more item data into a data record of a data base which is described by a form of a table including item names as field names, in a computer system including a processor unit and a terminal device, comprising:
    means for determining a subset of said sets of said knowledge to be transferred from said knowledge base to said data base based on appearance frequency of selected item names wherein the appearance frequency is greater than a preselected limit;

means for retrieving the item data corresponding to said determined subset from said knowledge base and producing data of said data base in the form of the table wherein fields of said table are based on said subset of said item names and records of said table are based on said retrieved item data; and, means for transferring the data produced based on said retrieved knowledge into said data base.

2. The knowledge translation system according to claim 1, wherein said means for determining includes means for selecting at least parts of the subset of knowledge for said data base in accordance with a predetermined relationship to statistics of said knowledge base contained in the appearance frequency.

3. The knowledge translation system according to claim 2, wherein said means for determining further includes means for organizing a data structure frame and relevant knowledge from said knowledge base in accordance with the predetermined relationship to said appearance frequency.

4. A method for translating knowledge comprising a plurality of sets having the form of one or more item names and one or more item data, contained within a knowledge system into data records comprising a form of a table including item names as field names, for a data base system comprising the steps of:

collecting item name knowledge and other correlated auxiliary knowledge within the knowledge system;

analyzing the appearance frequency of the collected item name knowledge in the knowledge system including identifying when the appearance frequency is greater than a preselected limit;

selecting a subset of said sets of knowledge for the data base system based on an analyzing result from said analyzing step;

developing a proposed data record structure having fields based on said selected subset;

retrieving the knowledge indicated by the proposed data record structure;

producing a data record from retrieved item data of said retrieving step; and storing the producing data record in the data base.

5. The knowledge to data translation method according to claim 4, wherein said developing step includes:

approving the proposed data record structure by an operator.

6. In a computer system comprising a knowledge base, a data base, a processing unit, and a terminal device, a method for translating knowledge data comprising a first, non-fixed form into data base data having a second fixed-form, comprising the steps of:

storing knowledge data in the knowledge base by an operator through the terminal device wherein the first, non-fixed form has a selectively variable data record structure comprising an item name selectively determinable at a time of input by the operator for identifying the knowledge data;

determining a range of knowledge data to be translated from the knowledge base to the data base by the processing unit comprising selecting the item name and a related item name having a predetermined semantic relationship thereto;

defining the second fixed form for a data base data structure to be assumed by the knowledge data upon translation to the data base;

retrieving the knowledge data within the determined range by the processing unit;

translating the retrieved knowledge data into the second fixed-form by the processing unit; and, storing the translated knowledge data into the data base.

7. The method for translating knowledge data according to claim 6 wherein the determining step includes:

producing frequency information indicative of a quantity of a selected item name and a selected related item name occurring within the knowledge base;

outputting the frequency information produced to the terminal device;

outputting an indication of the determined range of knowledge data to be transferred from the knowledge base to the data base, to the terminal device; and, outputting an indication of the second fixed-form of the base data to the terminal device.

8. The method for translating knowledge data according to claim 7 wherein said producing step includes:

selecting a portion of a determined range of knowledge data in accordance with a preselected relationship to the frequency information produced; and, selecting the second, fixed-form of the data base data in accordance with a preselected relationship to the frequency information produced.

* * * * *